United States Patent
Lähteenmäki et al.

(10) Patent No.: US 9,834,420 B2
(45) Date of Patent: Dec. 5, 2017

(54) MACHINERY BRAKE

(75) Inventors: Jussi Lähteenmäki, Hyvinkää (FI);
Tarvo Viita-Aho, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 1128 days.

(21) Appl. No.: 13/428,820

(22) Filed: Mar. 23, 2012

(65) Prior Publication Data
US 2012/0175201 A1 Jul. 12, 2012

Related U.S. Application Data

(63) Continuation of application No. PCT/FI2010/000056, filed on Sep. 23, 2010.

(30) Foreign Application Priority Data

Sep. 25, 2009 (FI) ..................................... 20095987

(51) Int. Cl.
*F16D 65/00* (2006.01)
*B66D 5/30* (2006.01)
*F16D 121/22* (2012.01)

(52) U.S. Cl.
CPC ........... *B66D 5/30* (2013.01); *F16D 65/0006* (2013.01); *F16D 2121/22* (2013.01)

(58) Field of Classification Search
CPC .... B66D 5/30; F16D 65/0006; F16D 2121/22
USPC ................. 188/158, 161, 164, 171
See application file for complete search history.

(56) References Cited

U.S. PATENT DOCUMENTS

| | | | | |
|---|---|---|---|---|
| 3,741,353 A | * | 6/1973 | McKinley et al. | 188/171 |
| 5,154,261 A | * | 10/1992 | Tanaka et al. | 188/171 |
| 5,274,290 A | * | 12/1993 | Fischer | 310/93 |
| 6,182,803 B1 | | 2/2001 | Hirai et al. | |
| 6,321,883 B1 | * | 11/2001 | Pfann et al. | 188/161 |

FOREIGN PATENT DOCUMENTS

| | | |
|---|---|---|
| DE | 29 34 396 A1 | 3/1981 |
| GB | 2 236 623 A | 4/1991 |
| GB | 2 258 702 A | 2/1993 |
| JP | 59062178 A * | 4/1984 |
| JP | H02-212632 A | 8/1990 |
| JP | 10-144515 A | 5/1998 |
| WO | WO 2008/034675 A1 | 3/2008 |
| WO | WO 2008/138458 A2 | 11/2008 |
| WO | WO 2010/061050 A1 | 6/2010 |

OTHER PUBLICATIONS

Translation of JP 59-062178 A, Imazawa et al., Apr. 1984.*

* cited by examiner

*Primary Examiner* — Thomas J Williams
(74) *Attorney, Agent, or Firm* — Birch, Stewart, Kolasch & Birch, LLP

(57) ABSTRACT

A brake includes a frame part; an armature part supported by the frame part in a manner that allows movement; an electromagnet for opening the brake; and also a damping arrangement for damping the noise of the brake. The damping arrangement is made to be conductive to magnetic flux, and the damping arrangement is fitted on the pathway of the magnetic flux of the electromagnet of the brake.

11 Claims, 1 Drawing Sheet

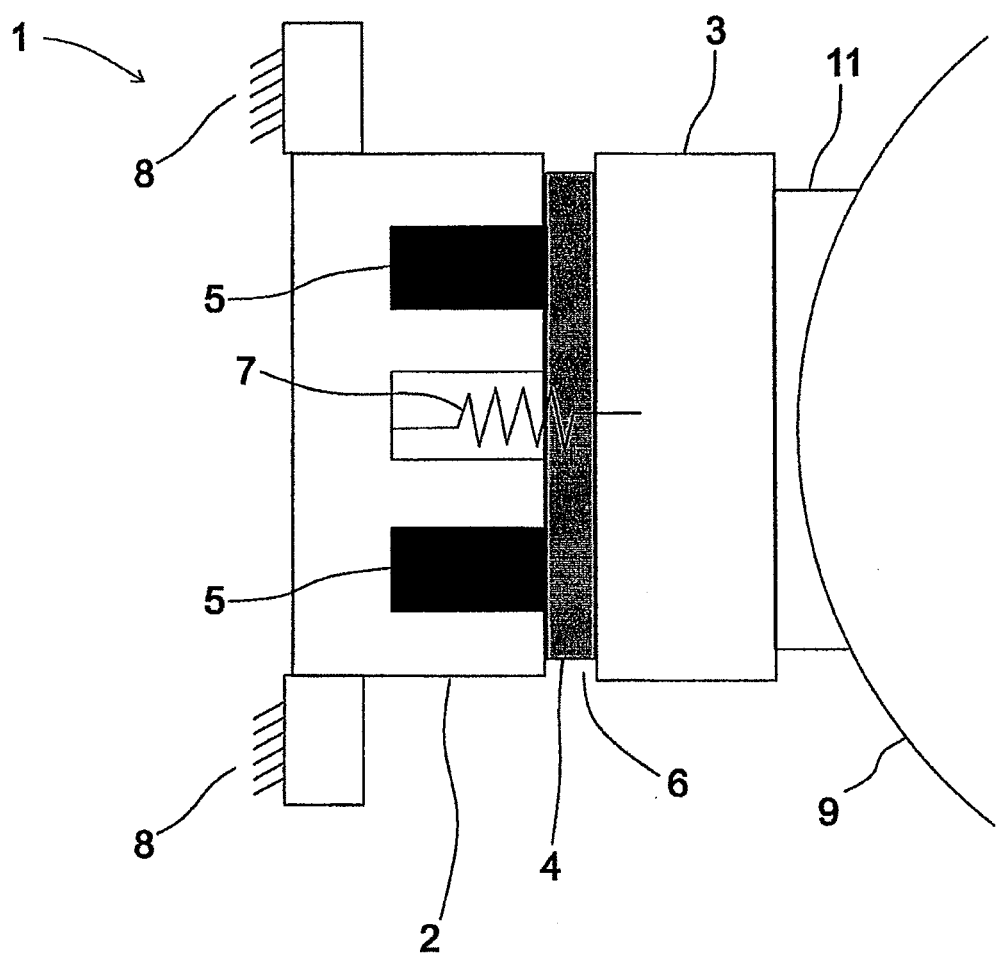

MACHINERY BRAKE

This application is a Continuation of PCT International Application No. PCT/FI2010/000056 filed on Sep. 23, 2010, which claims the benefit to Patent Application No. 20095987 filed in Finland, on Sep. 25, 2009. The entire contents of all of the above applications is hereby incorporated by reference into the present application.

FIELD OF THE INVENTION

The invention relates to solutions for damping the noise of a brake.

DESCRIPTION OF PRIOR ART

The hoisting machine of an elevator is braked with a machinery brake. An elevator car is kept in its position in the elevator hoistway with a machinery brake when the car is stopped at a floor level. This same brake is often used also as an emergency brake as required by elevator regulations, which brake activates in exceptional situations, such as during an electricity outage. A drum brake or a disc brake, for example, can be used as a brake.

The machinery brake of a hoisting machine of an elevator comprises a frame part and an armature part, provided with a brake pad, that moves in relation to the frame part. In addition, the machinery brake comprises a brake drum or brake disc that is connected to the rotor of the hoisting machine and rotates with it, which drum or disc comprises a braking surface. The machinery brake of an elevator generally operates such that when the brake is activated, the spring comprised in the machinery brake presses the brake shoe of the armature part against the braking surface of a rotating part of the machine, in which case the elevator car stays in its position. During a run, current is connected to the electromagnet comprised in the machinery brake and the magnet pulls the brake pad off the braking surface, in which case the brake is open and the elevator car can move up or down in the elevator hoistway. The brake implementation of the elevator can be e.g. such that the same hoisting machine comprises two or more machinery brakes.

As the current of the electromagnet decreases, the force exerted by the spring finally exceeds the force of attraction of the electromagnet, and the brake activates. Owing to the imbalance of forces the brake pad strikes against the braking surface of the rotating part of the machine. When the brake opens, the electromagnet again exerts on the armature part a force that is in the opposite direction to the spring force. When the force exerted on the armature part by the electromagnet grows to be greater than the spring force, the air gap between the frame part and the armature part closes, and the armature part strikes against the frame part.

Collision of the metallic parts of a brake against each other when the brake is activated or opened may cause a disturbing noise. The noise problem is eliminated whenever possible by adding e.g. a damper to the air gap between the frame part and the armature part, which damper when the brake is open prevents direct contact between the metal surfaces of the frame part and of the armature part, leaving a small so-called hysteresis air gap between the frame part and the armature part. The damper can be made of an elastic material, such as rubber; the damper can also be made of e.g. paper and glue.

The hysteresis air gap can vary e.g. owing to manufacturing tolerances of the damper. On the other hand, also the current of the electromagnet of the brake can vary, due among other things to a temperature variation of the resistance of the magnetizing coil. The force of attraction of the electromagnet decreases as the hysteresis air gap grows and/or the current of the magnetizing coil decreases. In this case the brake no longer necessarily stays open properly.

AIM OF THE INVENTION

The aim of the invention is to present a brake comprising a new type of improved damping arrangement for damping the noise of the brake. Owing to the new type of damping arrangement, in particular the power-producing properties of the electromagnet of the brake improve.

SUMMARY OF THE INVENTION

In relation to the characteristic attributes of the invention, reference is made to the claims.

The brake according to the invention comprises a frame part, an armature part supported by the frame part in a manner that allows movement, an electromagnet for opening the brake and also a damping arrangement for damping the noise of the brake. The aforementioned damping arrangement is made to be conductive to magnetic flux, and the aforementioned damping arrangement is fitted on the pathway of the magnetic flux of the electromagnet of the brake, i.e. in the magnetic circuit of the electromagnet of the brake. The damping arrangement preferably comprises a damper, which contains a magnetizable material. This type of damper can be made of e.g. a ferromagnetic composite material. Ferromagnetic composite material comprises a binder material, i.e. a matrix, preferably a polymer matrix, into which particles of a ferromagnetic material are embedded, preferably a magnetically soft material, such as iron or ferrite, such that as a result a flexible ferromagnetic composite is obtained. The use of a ferromagnetic composite material as a damper of a brake is advantageous because by the aid of a flexible matrix good damping properties are achieved with the material; the ferromagnetic material added to the matrix, on the other hand, makes the material conductive to magnetic flux.

The damper can also be of a cellular elastomer, such as of polyurethane, to which a magnetizable material, e.g. powdered iron, has been added.

Since the damping arrangement/damper conducts magnetic flux, also the total reluctance of the magnetic circuit is smaller than when using prior-art damping arrangements that do not conduct magnetic flux. Owing to the reduction in total reluctance, a greater magnetic flux can be brought about with a certain excitation current. In this case the force of attraction produced by the electromagnet also grows, and the brake stays open better.

In one embodiment of the invention the damping arrangement, preferably a damper, is fitted into the space in the brake between the frame part and the armature part. In this case, by means of the damping arrangement, direct contact between the metal surfaces of the frame part and of the armature part can be prevented. At the same time the damping arrangement leaves a hysteresis air gap between the frame part and the armature part that are trying to move towards each other. Since the damping arrangement conducts magnetic flux, the reluctance met by the magnetic flux crossing the hysteresis air gap is smaller than prior art. In this case also the variation of the force of attraction, and possibly also the variation of stray flux, caused by the variation of the air gap remains smaller than prior art.

The aforementioned summary, as well as the additional features and additional advantages of the invention presented below will be better understood by the aid of the following description.

BRIEF EXPLANATION OF THE FIGURES

In the following, the invention will be described in more detail by the aid of some embodiments, which do not in themselves limit the scope of application of the invention, with reference to FIG. 1, which illustrates a brake according to the invention.

MORE DETAILED DESCRIPTION OF PREFERRED EMBODIMENTS OF THE INVENTION

FIG. 1 presents an illustrative view of a drum brake 1 of a hoisting machine of an elevator according to the invention. The drum brake 1 comprises a frame part 2, which is fixed to the frame of the hoisting machine 8. The drum brake 1 also comprises an armature part 3 supported by the frame part 2 in a manner that allows movement.

The drum brake 1 comprises a leaf spring pack 7, which comprises a number of spring leaves. The leaf spring pack exerts a thrusting force between the frame part 2 and the armature part 3, which thrusting force endeavors to push the armature part 3 towards the brake drum 9 that is attached to the rotating rotor of the hoisting machine 8. The armature part 3 comprises a brake pad 11, through which the armature part 3 connects mechanically to the brake drum 9 to brake the movement of the elevator car when the machinery brake 1 is activated. The drum brake 1 opens when the current supplied to the coil of the electromagnet 5 disposed in the frame part 2 achieves a force of attraction between the frame part 2 and the armature part 3, which force is greater than the thrusting force achieved by the leaf spring pack 7. In this case the armature part 3 starts to move towards the frame part 2.

The magnetic flux produced by the electromagnet 5 of the brake 1 circulates via the frame part 2 and the armature part 3. The frame part 2 and the armature part 3 comprise ferromagnetic iron cores, which form the magnetic circuit of the electromagnet 5 of the brake with an air gap 6 between the frame part 2 and the armature part 3. The iron cores of the frame part 2 and of the armature part 3 move in relation to each other such that when the brake 1 opens the air gap 6 between the iron cores becomes smaller and when the brake 1 activates the air gap 6 grows.

A damper 4 for damping the noise of the brake is fitted into the air gap 6 between the iron cores of the frame part 2 and of the armature part 3. The damper 4 is made of a ferromagnetic composite material, which comprises an essentially flexible matrix, to which matrix ferromagnetic material has been added. In other words, the matrix is of a binder material, preferably of a polymer, into which particles of a magnetically soft material, such as iron or ferrite, are embedded such that as a result a flexible ferromagnetic composite that conducts magnetic flux is obtained. In this case, by means of the damper, direct contact between the metal surfaces of the frame part 2 and of the armature part 3 can be prevented when the brake 1 opens. At the same time the damper 4 leaves a hysteresis air gap 6 between the frame part 2 and the armature part 3 that are trying to move towards each other. Since the damper 4 conducts magnetic flux, the reluctance met by the magnetic flux crossing the hysteresis air gap 6 is smaller than prior art. In this case also the variation of the force of attraction, and possibly also the variation of stray flux, caused by the variation of the air gap 6 remains smaller than prior art.

The aforementioned ferromagnetic composite materials are a fairly new class of material, which has earlier been used e.g. for the interference protection of electromagnetic fields and for controlling magnetic flux. The relative permeability, plasticity and material strength of composite depends on the mixing proportion.

Preferably the ferromagnetic composite material according to the invention is of a flexible ferrite polymer composite, i.e. FPC. FPC is a homogeneous mixture of powdered ferrite and plastic and it retains its magnetic and mechanical properties over a wide temperature range and frequency range. The ferrite particles are distributed in the binder material such that the mechanical behavior of the material is largely determined on the basis of the binder material and the magnetic properties on the basis of the ferrite particles, in which case as a result a durable material is obtained, which material has stable mechanical and electromagnetic properties. No significant irreversible changes occur in the mechanical and electromagnetic properties of FPC even if it were used over a wide pressure range and temperature range and subjected to the effects of magnetic fields. For this reason FPC is very well suited for use in the damper 4 of the noise of a brake according to the invention.

The FPC materials applicable for use according to the invention are e.g. EPCOS's C303, which is manufactured by dye pressing, C302, which is manufactured by injection molding, and C350 and C351, which are manufactured by sheet casting.

In one embodiment of the invention the damper 4 is made from a ferrite polymer composite film (FPC film), the thickness of which is approx. 0.2 . . . 0.4 millimeters.

In a second embodiment of the invention the damper 4 is made from a ferrite polymer composite sheet (FPC sheet), the thickness of which is approx. 0.4 . . . 1 millimeter or even more.

The invention is described above in connection with a drum brake; however, the damping arrangement according to the invention can also be used e.g. for the damping of the noise of a disc brake.

The brake 1 according to the invention is suited for use e.g. as a machinery brake on the motor drives of various transport apparatuses. These types of transport apparatuses are e.g. passenger elevators, freight elevators, cranes, positive drive elevators, travelators and escalators. In this case the elevator system can also be without a machine room, in which case the hoisting machine of the elevator is disposed in the elevator hoistway. The significance of noise damping of the brake is emphasized in an elevator without a machine room, because the noise of the brake easily carries from the elevator hoistway to elsewhere in the building.

It is obvious to the person skilled in the art that the invention is not limited solely to the examples described above, but that it may be varied within the scope of the claims presented below.

It is obvious to the person skilled in the art that the invention is not limited solely to the examples described above, but that it may be varied within the scope of the claims presented below.

The invention claimed is:
1. A brake comprising:
a frame part;
an armature part supported by the frame part in a manner that allows movement;
an electromagnet for opening the brake; and a damping arrangement for damping the noise of the brake, wherein the damping arrangement is made to be conductive to magnetic flux, wherein the damping arrangement is fitted on the pathway of the magnetic flux of the electromagnet of the brake, wherein the damping arrangement is made of a ferromagnetic composite material, which comprises a flexible matrix, to which matrix ferromagnetic material has been added, wherein the damping arrangement is made from ferrite polymer composite, and wherein the damping arrangement is made from a ferrite polymer composite film, the thickness of which is approximately 0.2 to 0.4 millimeters.

2. The brake according to claim 1, wherein the damping arrangement is fitted into a space in the brake between the frame part and the armature part.

3. The brake according to claim 1, wherein the damping arrangement is fitted into an air gap between the frame part and the armature part.

4. The brake according to claim 1, wherein the brake comprises a spring for activating the brake.

5. An elevator system comprising:
a hoisting machine for moving the elevator car,
wherein the hoisting machine of the elevator comprises a brake according to claim 1 for braking the movement of the elevator car.

6. The elevator system according to claim 5, wherein the hoisting machine of the elevator is disposed in the elevator hoistway.

7. The brake according to claim 2, wherein the damping arrangement is fitted into an air gap between the frame part and the armature part.

8. The brake according to claim 2, wherein the brake comprises a spring for activating the brake.

9. The brake according to claim 3, wherein the brake comprises a spring for activating the brake.

10. A brake comprising:
a frame part;
an armature part supported by the frame part in a manner that allows movement;
an electromagnet for opening the brake; and
a damping arrangement for damping the noise of the brake,
wherein the damping arrangement is made to be conductive to magnetic flux,
wherein the damping arrangement is fitted on the pathway of the magnetic flux of the electromagnet of the brake,
wherein the damping arrangement is made of a ferromagnetic composite material, which comprises a flexible matrix, to which matrix ferromagnetic material has been added,
wherein the damping arrangement is made from ferrite polymer composite, and
wherein the damping arrangement is made from a ferrite polymer composite sheet, the thickness of which is approximately 0.4 to 1 millimeter or even more.

11. The brake according to claim 10, wherein the brake comprises a spring for activating the brake.

* * * * *